(12) United States Patent
Raz et al.

(10) Patent No.: US 9,751,628 B2
(45) Date of Patent: Sep. 5, 2017

(54) MULTIPLE DELIVERY SLING-LOAD SYSTEM AND METHOD

(71) Applicant: TECHNION RESEARCH & DEVELOPMENT FOUNDATION LTD., Haifa (IL)

(72) Inventors: Reuben Raz, Reut (IL); Aviv Rosen, Haifa (IL)

(73) Assignee: TECHNION RESEARCH & DEVELOPMENT FOUNDATION LTD., Haifa (IL)

( * ) Notice: Subject to any disclaimer, the term of this patent is extended or adjusted under 35 U.S.C. 154(b) by 0 days.

(21) Appl. No.: 15/262,221

(22) Filed: Sep. 12, 2016

(65) Prior Publication Data

US 2017/0029110 A1    Feb. 2, 2017

Related U.S. Application Data

(63) Continuation of application No. 13/992,884, filed as application No. PCT/IL2011/050047 on Dec. 7, 2011, now Pat. No. 9,440,741.

(30) Foreign Application Priority Data

Dec. 8, 2010    (IL) .......................................... 209844

(51) Int. Cl.
| | |
|---|---|
| *B66C 1/12* | (2006.01) |
| *B64D 1/22* | (2006.01) |
| *B64D 1/12* | (2006.01) |
| *B66C 1/38* | (2006.01) |
| *B65D 21/02* | (2006.01) |
| *F16B 45/00* | (2006.01) |

(52) U.S. Cl.
CPC ................. B64D 1/22 (2013.01); B64D 1/12 (2013.01); B65D 21/0209 (2013.01); B66C 1/12 (2013.01); B66C 1/38 (2013.01); F16B 45/00 (2013.01)

(58) Field of Classification Search
CPC .... B64D 1/12; B64D 1/22; B66C 1/12; B66C 1/38; B65D 21/0209; F16B 45/00
USPC ....... 294/75, 76, 82.24, 82.26, 82.31, 82.36, 294/81.53; 244/137.1, 137.4
See application file for complete search history.

(56) References Cited

U.S. PATENT DOCUMENTS

| | | | |
|---|---|---|---|
| 610,816 | A | 9/1898 | Mallon |
| 2,357,182 | A | 8/1944 | Farmer |
| 2,431,194 | A | 11/1947 | O'Brien |
| 3,380,602 | A | 4/1968 | Yanow |

(Continued)

FOREIGN PATENT DOCUMENTS

| | | |
|---|---|---|
| EP | 0650919 A1 | 5/1995 |
| FR | 2796255 A1 | 1/2001 |
| GB | 2369101 A | 5/2005 |

OTHER PUBLICATIONS

International Search Report for PCT/IL11/50047 Completed Jun. 21, 2012; dated Jun. 27, 2012 5 pages.

(Continued)

*Primary Examiner* — Gabriela Puig
(74) *Attorney, Agent, or Firm* — The Roy Gross Law Firm, LLC; Roy Gross

(57) ABSTRACT

An add-on sling-load system capable of being attached to a host that comprises a load provided with at least two slices arrange in a predetermined configuration and preferably a stack and a controlled coupling mechanism configured to (Continued)

attach and release at least one slice from the arranged configuration. The sling load system is used for multiple devices.

13 Claims, 6 Drawing Sheets

(56) References Cited

U.S. PATENT DOCUMENTS

| | | |
|---|---|---|
| 3,765,711 A | 10/1973 | Hammond |
| 3,980,185 A | 9/1976 | Cain |
| 4,128,267 A | 12/1978 | Niblett et al. |
| 4,341,495 A | 7/1982 | Del' Acqua |
| 4,881,601 A | 11/1989 | Smith |
| 5,161,705 A | 11/1992 | Takai |
| 5,328,133 A | 7/1994 | Charest et al. |
| 5,344,203 A | 9/1994 | Tollenaere |
| 5,593,113 A | 1/1997 | Cox |
| 5,836,548 A | 11/1998 | Dietz et al. |
| 7,014,234 B2 | 3/2006 | Walker |
| 7,549,687 B2 | 6/2009 | Takai |
| 7,887,011 B1 | 2/2011 | Baldwin |
| 8,177,463 B2 | 5/2012 | Walker |
| 2008/0099622 A1 | 5/2008 | Yoffe |

OTHER PUBLICATIONS

Written Opinion for PCT/IL11/50047 Completed Jun. 21, 2012; dated Jun. 27, 2012 5 Pages.
International Preliminary Report for Patentability for PCT/IL11/50047 Completed Jun. 21, 2012; dated Jun. 27, 2012 6 pages.

MULTIPLE DELIVERY SLING-LOAD SYSTEM AND METHOD

FIELD OF THE INVENTION

The present invention relates to transporting loads by aircraft. More specifically, the invention relates to systems and methods for releasing sling loads from vertical takeoff and landing aircrafts.

BACKGROUND

Civil and military situations introduce the need to transport supplies by air, particularly when rough terrain or combat conditions pose access challenges to other means of transportation. In such cases, helicopters are commonly used for the task of carrying loads from one spot to another. Loads can be carried inside the helicopter fuselage or externally using slings. In the case that sling loads are used, supplies are packed and hung outside the helicopter using slings. The slings are typically attached to a hook located on the underside of the helicopter fuselage. At the drop-off point, a ground crew releases the load from the sling.

Delivery of a single load may be performed without a ground crew by releasing the sling and leaving the load in the area. However, some situations require the delivery of different loads to multiple locations. Where multiple deliveries are required, it has usually been necessary to send separate helicopter sorties to each location, each sortie delivering a single load. Alternatively, it has been necessary for a ground crew to be present at each destination to unload the required load separately. Both options are wasteful. Running multiple helicopter sorties is financially expensive and may be dangerous. Sending a single helicopter with multiple loads is time consuming, as the process of freeing loads from the sling needs to be repeated at each stop. It will be appreciated that in combat situations, a lengthy procedure may endanger the helicopter, its personnel and the ground crew.

Existing multiple load delivery systems, such as the system on Kaman BURRO helicopters, require the provision of a system of multiple hooks from which each load may be supported on a dedicated sling and individually released by an electrical device controlled by the pilot or operator. It will be appreciated, however that where the system of multiple hooks is not installed upon the helicopter, the Burro system may not be suitable. Furthermore, releasing slings from the hooks causes the overall balance of the aircraft to change during flight. In addition, the pilot must take precautions to prevent the multiple sling loads from becoming entangled.

The need remains therefore, for an efficient system to distribute supplies to multiple sites in a single sortie without the help of ground crews. Embodiments described hereinbelow address this need.

SUMMARY OF THE EMBODIMENTS

It is therefore provided in accordance with a preferred embodiment of the present invention, an add-on sling-load system for multiple deliveries capable of being attached to a host, the sling-load comprising:
  a load provided with at least two slices arranged in a predetermined configuration;
  a controlled coupling mechanism configured to attach and release at least one slice from said predetermined configuration.

Furthermore, in accordance with another preferred embodiment of the present invention, said predetermined configuration is a stack of slices mounted one on top of the other.

Furthermore, in accordance with another preferred embodiment of the present invention, said controlled coupling system is configured to release a bottommost slice from said stack of slices.

Furthermore, in accordance with another preferred embodiment of the present invention, said controlled coupling mechanism is activated from said load.

Furthermore, in accordance with another preferred embodiment of the present invention, said controlled coupling mechanism is activated from said host.

Furthermore, in accordance with another preferred embodiment of the present invention, said coupling mechanism comprises at least one attachment mechanism and at least one release mechanism.

Furthermore, in accordance with another preferred embodiment of the present invention, the system further comprises at least one detector.

Furthermore, in accordance with another preferred embodiment of the present invention, said at least one detector is configured to detect changes in tension applied to the sling.

Furthermore, in accordance with another preferred embodiment of the present invention, said at least one detector is configured to detect contact of at least one of the slices with a platform.

Furthermore, in accordance with another preferred embodiment of the present invention, the system further comprising at least one trigger configured to activate said at least one release mechanism.

Furthermore, in accordance with another preferred embodiment of the present invention, said at least one trigger is configured to release at least one of the slices.

Furthermore, in accordance with another preferred embodiment of the present invention, said bottommost slice is released by said at least one trigger.

Furthermore, in accordance with another preferred embodiment of the present invention, said at least one trigger is configured to be activated upon detection of tension reduction on said sling-load.

Furthermore, in accordance with another preferred embodiment of the present invention, said at least one trigger is configured to be activated upon detection of contact with a platform.

Furthermore, in accordance with another preferred embodiment of the present invention, said at least one trigger is manually controlled.

Furthermore, in accordance with another preferred embodiment of the present invention, activation of said at least one trigger is wireless.

Furthermore, in accordance with another preferred embodiment of the present invention, said at least one slice is configured to couple with at least one aerodynamic-shaping surface.

Furthermore, in accordance with another preferred embodiment of the present invention, said host is a vertical takeoff aircraft.

Furthermore, in accordance with another preferred embodiment of the present invention, said vertical takeoff aircraft is selected from a group consisting of helicopters, autogyros, balloons, powered parachutes, rockets and airships.

Furthermore, in accordance with another preferred embodiment of the present invention, said host is a crane.

Furthermore, in accordance with another preferred embodiment of the present invention, said crane is used in the context of construction, manufacturing or warehousing.

Furthermore, in accordance with another preferred embodiment of the present invention, said host is a vending machine.

Furthermore, in accordance with another preferred embodiment of the present invention, said system is further provided with a sling.

It is furthermore provided in accordance with another preferred embodiment of the present invention, a method for delivering sliced loads to multiple locations in a single sortie, said method comprising:
preparing a sliced-load comprising a plurality of slices;
attaching the sliced-load to a sling;
carrying the sliced-load to a target-location of at least one slice;
releasing said at least one slice of the load at said target-location.

Furthermore, in accordance with another preferred embodiment of the present invention, said preparing a sliced-load comprising a plurality of slices comprises:
stacking said plurality of slices into a stack;
attaching adjacent slices using a coupling mechanism.

Furthermore, in accordance with another preferred embodiment of the present invention, slices of said sliced-load are to be delivered to a plurality of target-locations, wherein said carrying the sliced-load to a target-location of at least one slice and said releasing said at least one slice of the load at said target-location are repeated.

BRIEF DESCRIPTION OF THE FIGURES

For a better understanding of the invention and to show how it may be carried into effect, reference will now be made, purely by way of example, to the accompanying drawings.

With specific reference now to the drawing in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention; the description taken with the drawing making apparent to those skilled in the art how the several forms of the invention may be embodied in practice.

Figure 1:
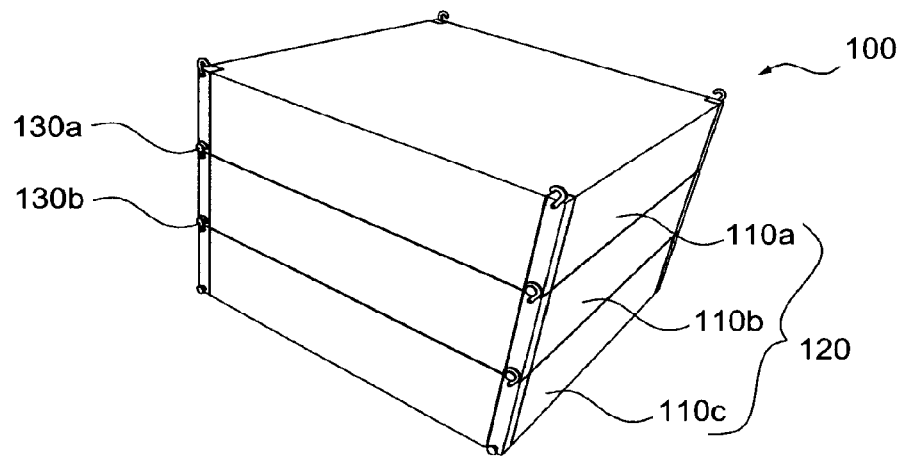
Figure 2:
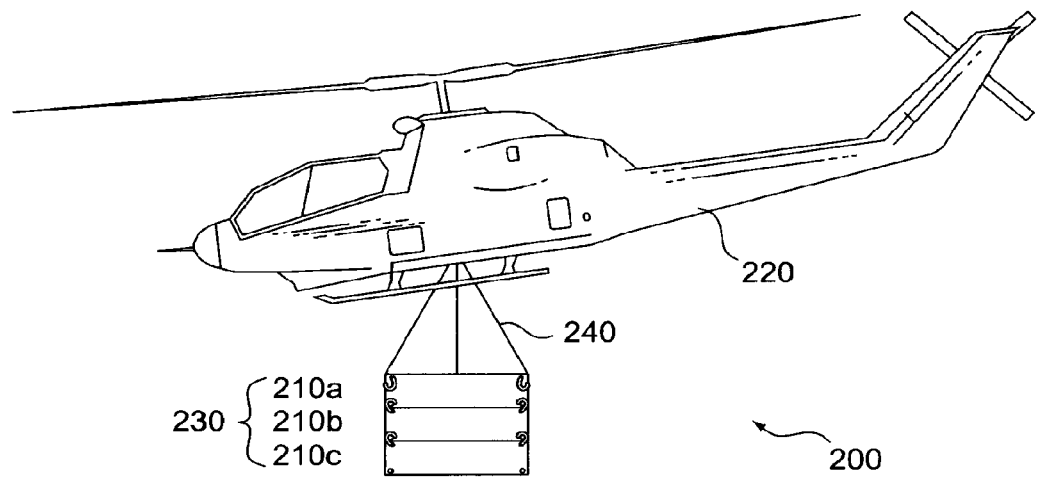
Figure 3:
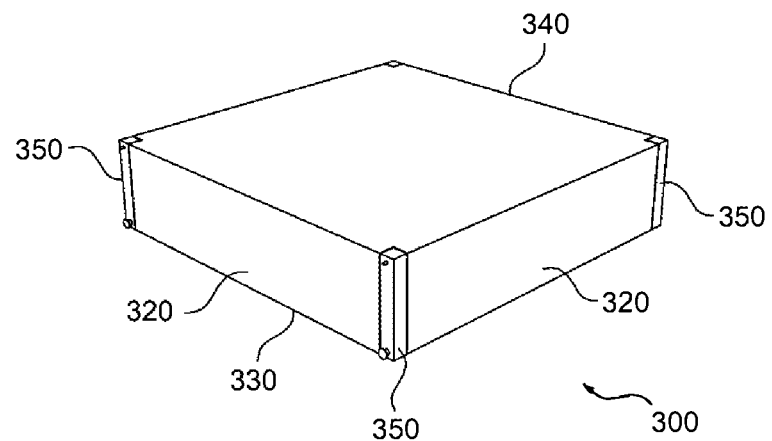
Figure 4:
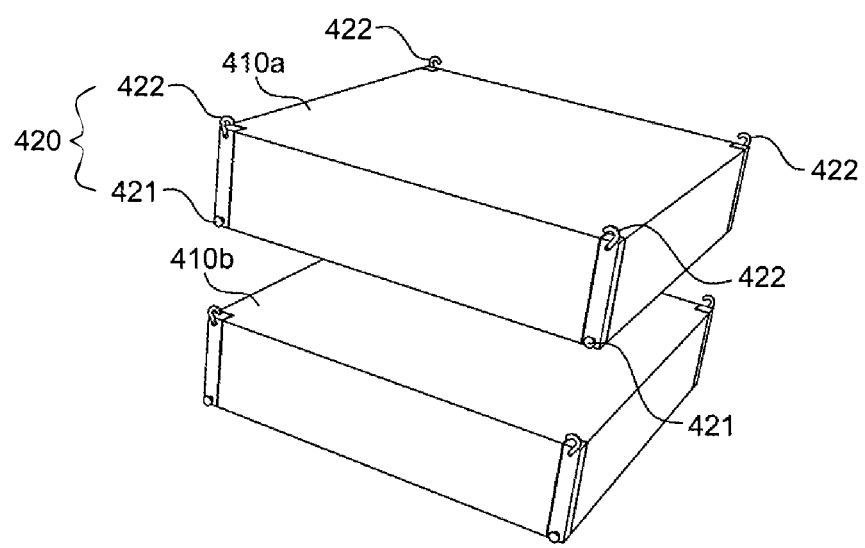
Figures 5A, 5B:
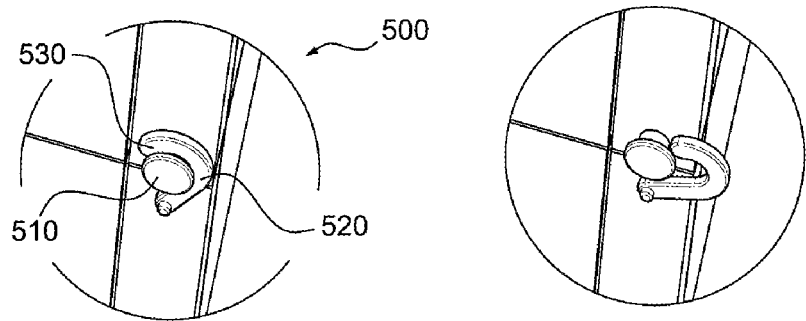
Figure 6:
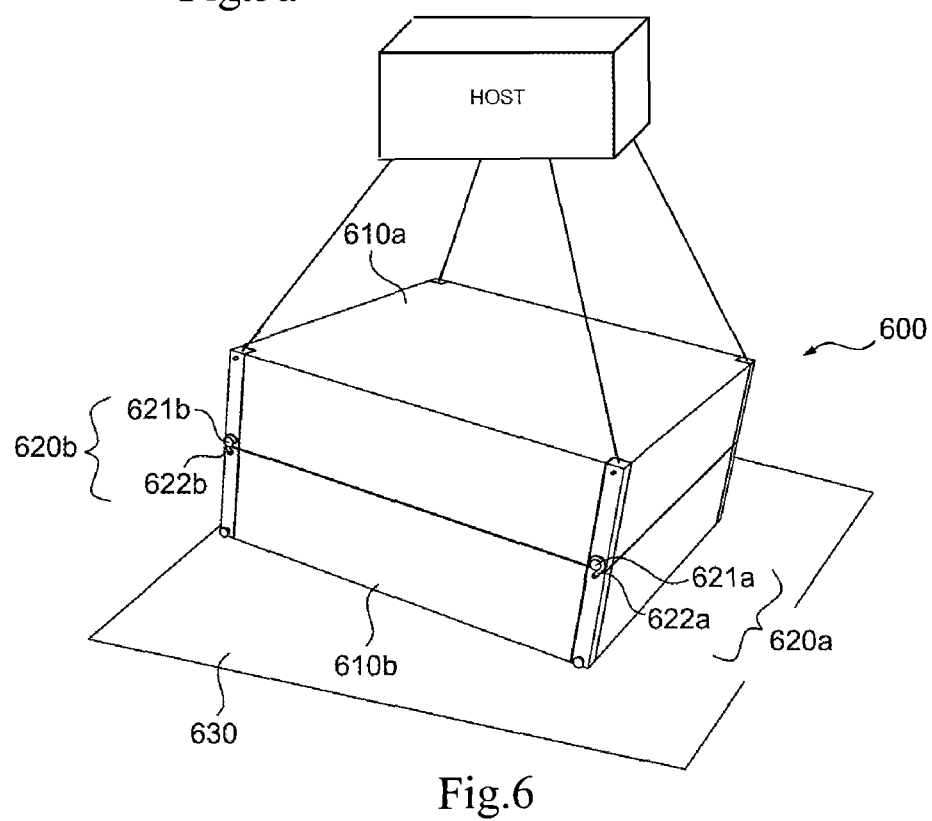
Figure 7:
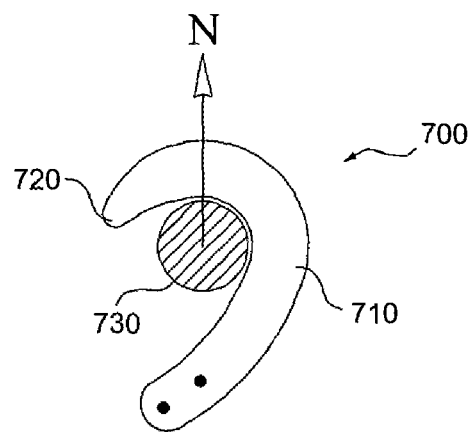
Figure 8:
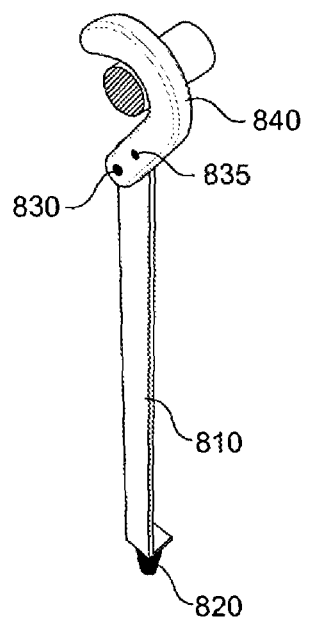
Figure 9A:
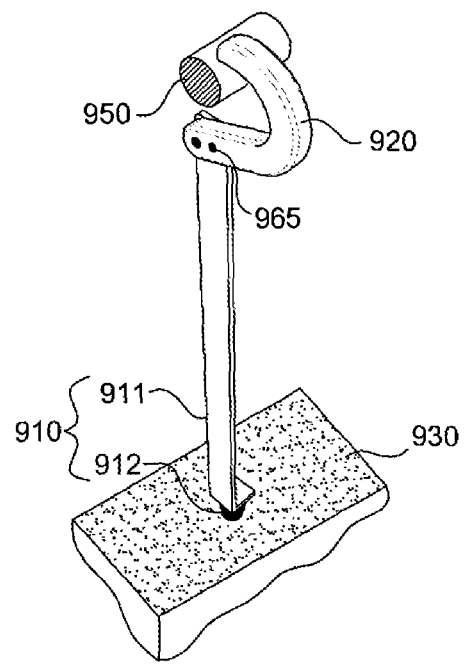
Figure 9B:
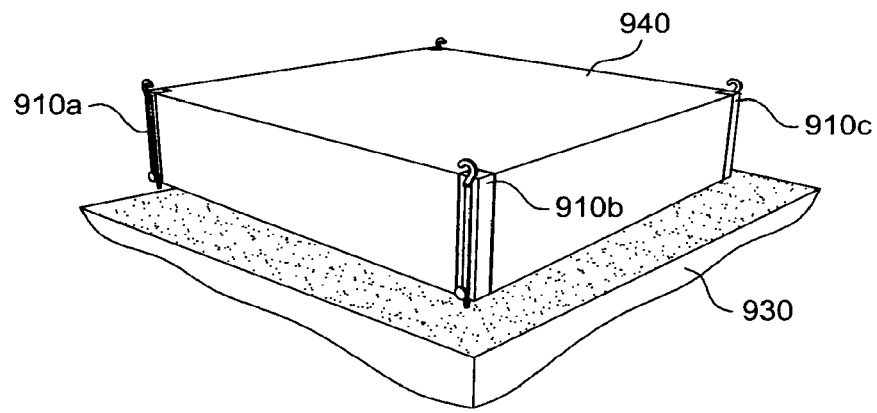
Figure 10:
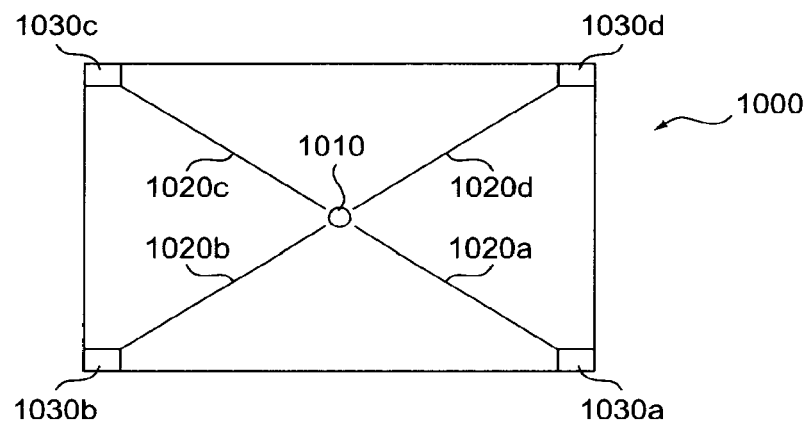
Figure 11:
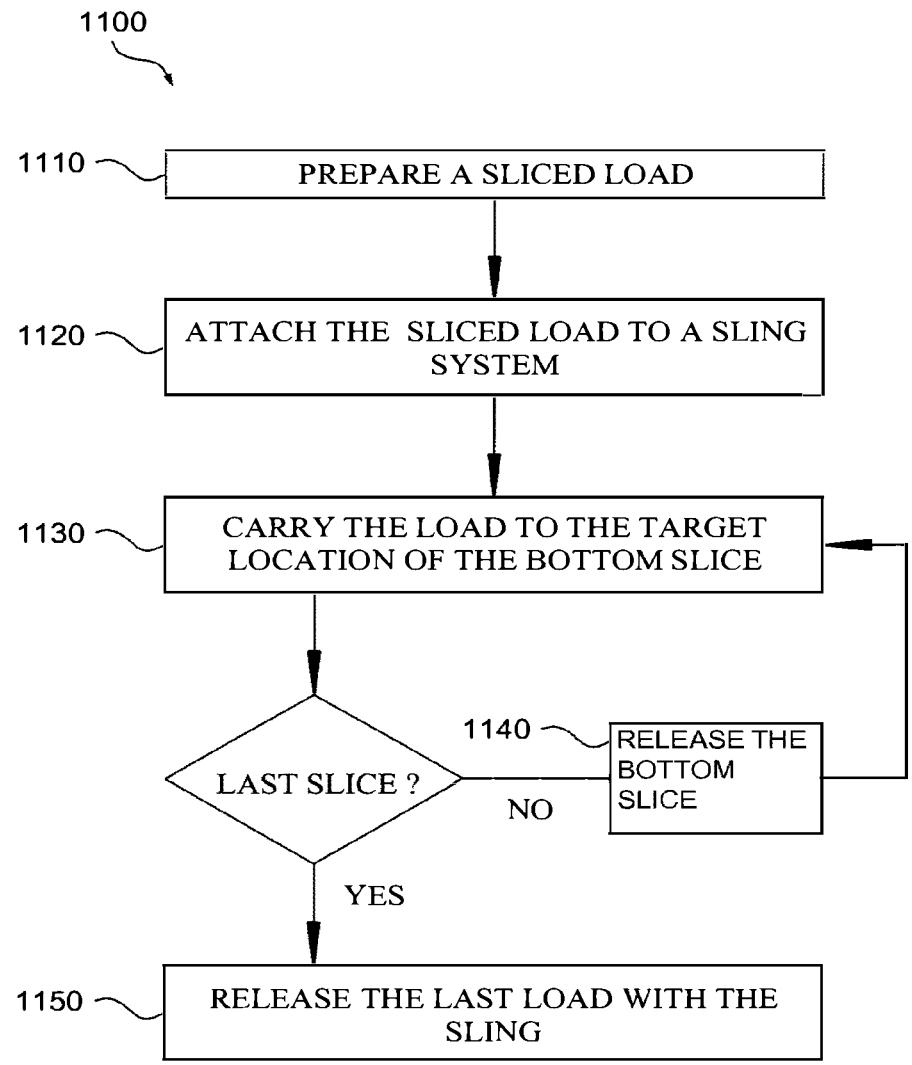

In the accompanying drawings,

FIG. 1 illustrates a side view of an embodiment of the multiple delivery sling-load system;

FIG. 2 schematically illustrates an embodiment of the system including a mobile delivery unit;

FIG. 3 illustrates an isometric projection of an embodiment of a single container;

FIG. 4 is an expanded view of two adjacent slices having embodiments of a mechanical attachment mechanism;

FIG. 5A illustrates an embodiment of a clasp configured to couple two slices together in a coupled state;

FIG. 5B illustrates an embodiment of a clasp configured to couple two slices together in a de-coupled state;

FIG. 6 illustrates two slices coupled to each other and lifted from a platform as a single load;

FIG. 7 illustrates the effect of selected forces acting on an embodiment of a clasp used to couple two slices together as the slices are lifted off a platform;

FIG. 8 illustrates an embodiment of a release mechanism;

FIG. 9A illustrates an embodiment of a release mechanism coupled to an attachment mechanism in its open configuration and placed on a platform;

FIG. 9B illustrates three of four release mechanisms running vertically along the side arms of a cuboid slice placed on a platform;

FIG. 10 shows a view of an underside of a slice comprising an embodiment of a simultaneous release trigger; and FIG. 11 is a flow chart illustrating a procedure for the delivery of multiple loads to multiple locations in a single sortie using an embodiment of the sling-load system.

DETAILED DESCRIPTION OF THE SELECTED EMBODIMENTS

Embodiments of the multiple delivery sling-load system enable distribution of supplies carried on external slings by vertical takeoff and landing (VTOL) aircrafts, cranes or the like, to multiple locations in a single sortie, possibly without the intervention of a ground crew. Such a system is particularly useful when efficient airborne distribution is necessary, for example in civil or military situations (delivering food, water, medical gear, ammunition or the like to combat zones or natural disaster areas, for example).

Although applications to vertical takeoff and landing are described above it will be appreciated that the system described hereinbelow may be applicable to any delivery between platforms. In particular the system may be used for example when supplies are delivered from a moving platform to another moving platform where the two moving platforms are traveling with similar velocities. Such is the case with mid-flight airborne delivery, air to sea delivery and the like, where no vertical takeoff or landing is necessary.

Embodiments of a multiple delivery sling-load system include elements for packing multiple loads together, in a way that enables them to be securely carried together on slings by air. The packing elements and techniques offer a stable operation throughout the entire flight envelope of the load, for all the combinations of numbers and weights of loads, while maintaining acceptable sling angles. Embodiments also include elements that enable delivering one of the loads to a target location, while still keeping the rest of the loads securely packed together and ready to be carried to elsewhere.

Reference is now made to FIG. 1, showing a side view of an embodiment of the multiple delivery sling-load system comprising a sliced load 100. Such sling-load system is an add-on system that can possibly be incorporated in many applications as indicated in the following specification. The sling-load system can be connected directly to the host of through a sling that is attached to the host and forms a connection between the load and the host. Supplies may be loaded into containers 110a, 110b, 110c which may be stacked and connected by coupling mechanisms 130a, 130b. Each such stackable container 110a-c comprises a 'slice', and a load comprising a stack 120 of one or more such containers will be referred to as a 'sliced load'.

Each shipment intended for delivery to a specific drop-location is placed within a separate slice 110. At each drop-location, only the bottommost slice 110c of the sliced load 100 is released.

FIG. 2 schematically illustrates an embodiment of the system including a mobile delivery unit 200 comprising three slices 210a, 210b, 210c being carried by a helicopter 220. The use of such a packing system where one slice is stacked on top of another helps maintain a near constant dragweight ratio even as slices are removed and the stack 230 hanging from a sling changes in dimension and weight. The uppermost slice 210a is lifted by the sling 240, and each of the other slices is lifted by the slice above it (slice 210c is lifted by slice 210b, which is lifted by the uppermost slice 210a). It will be appreciated that alternative packing systems and configurations may be used for example having slices placed and attached next to each other. Any possible orientation of the slices can be employed without limitation of the scope of the present invention.

Reference is now made to FIG. 3, showing an isometric projection of an embodiment of a single container 300. The container may include a frame, four side walls 320, floor 330, optionally a roof 340 and four corner fittings 350. The frame and corner fittings 350 of the container 300 are typically made of a stiff and robust material (such as steel, aluminum, fiberglass or the like), and the side walls 320, floor 330 and roof 340 typically made of a light material optionally comprised of a composite material, possibly a combination of metal and plastic elements.

The containers comprising the sliced load are typically similar in size and shape to one another. Slices comprising the load are preferably packed in a shape that helps maintain balance of the load as it hangs on the sling 240 (FIG. 2) such as, but not limited to, a cylinder or a cube. The system is optionally configured such that supplies placed within each slice may be evenly distributed within the container 300 comprising the slice. Alternatively, the system may be configured such that supplies may be placed within each slice in a non-even distribution within the container 300.

Referring back to FIG. 1 in various embodiments of the multiple delivery sling-load system 100, the load is comprised of several slices 110a-c arranged in a stack 120, with each slice 110a-c optionally being destined for delivery at a different location. A coupling mechanism 130 is provided to enable the coupling and decoupling of adjacent slices 110a-c in the stack 120. Such a mechanism typically includes an attachment mechanism and a release mechanism.

The attachment mechanism is configured to attach the different slices one on top of the other in a way that is securely fastened as described hereinbelow in relation to FIG. 5. The release mechanism is configured to detach the fastened slices from each other as described hereinbelow in relation to FIG. 8. The coupling mechanism 130 may utilize mechanical elements, electrical elements (such as electromagnets, pyrotechnic, and solenoids), pneumatic elements which use pressurized air to effect mechanical motion, or the like.

Reference is now made to FIG. 4, showing an expanded view of two adjacent slices 410a and 410b having embodiments of a mechanical attachment mechanism 420. The attachment mechanisms are configured to securely fasten the two slices 410a and 410b together.

The embodiment shown in FIG. 4 includes an upper-slice 410a and a lower-slice 410b. In the two slices presented in the embodiment, the attachment mechanism 420 is typically comprised of several attachment clasps 420 assembled on each of four corner-fittings of each slice. Optionally, the number of attachment clasps may vary according to need, for example and without limitation two clasps assembled on two diagonal corners of a cubical container, a plurality of clasps assembled in a plurality of locations upon the container, or the like.

Reference is now made to FIGS. 5a and 5b, showing a preferred embodiment of a clasp 500 configured to couple two slices together in a coupled state and a de-coupled state respectively. The clasp is comprised of a notch 510 and a catch 520 with a hook 530. The clasp is configured such that when the notch 510 is placed within the catch 520 it is secured by the hook 530. Referring back to FIG. 4, in each attachment mechanism 420, the notch 421 is typically connected to the lower side of the side walls of the upper slice 410a and the catch 422 is typically connected to the upper side of the side walls of the lower slice 410b.

Reference is now made to FIG. 6, showing two slices 610a and 610b coupled to each other as they are lifted from a platform 630 as a single load. FIG. 6 illustrates the uppermost slice 610a being lifted by the sling (240 in FIG. 2). The second slice 610b is lifted by slice 610a via the coupled clasps 620a, 620b. The notches 621a, 621b on the uppermost slice 610a engage the catches 622a, 622b of the lower slice 610b.

Reference is now made to FIG. 7, showing the effect of selected forces acting on an embodiment of the clasp 700 used to couple together the two slices mentioned in FIG. 6 as they are being lifted from a platform. The weight supported by the second slice 610b exerts a force downwards upon the catch 710. The catch 710 of one slice engages a notch 730 from a slice above it. The normal force acting on the catch 710 at the point of contact between the notch 730 and the catch 710 has the effect of securing the hook 720. The hook 720 at the end of the catch 710 is configured to prevent the notch 730 from escaping the grasp of the catch 710.

Reference is now made to FIG. 8, showing an embodiment of a release mechanism coupled with an attachment mechanism. In this 5 embodiment, the release mechanism comprises a transmission rod 810 and a retracting and expanding element such as but not limited to a spring 820. The release mechanism is rotatably coupled to the attachment mechanism 840 via a first coupling pin 830 or such like. In addition, the attachment mechanism 840 is rotatably coupled to a container (not shown) via a second coupling pin 835.

Reference is now made to FIGS. 9a and 9b, FIG. 9a showing an embodiment of a release mechanism 910 coupled to an attachment mechanism 920 in its open configuration and placed on a platform 930, and FIG. 9b showing three of four such release mechanisms 910a, 910b and 910c running vertically along the side arms of a cuboid slice 940 placed on a platform 930. The weight of the slice 940 when placed on a platform 930 triggers the release mechanisms 910a, 910b, and 910c. Referring back to FIG. 9a, the platform 930 presses against the spring 912 thus causing the transmission rod 911 to lift from the platform 930. When the transmission rod 20 911 is lifted, the attachment mechanism 920 coupled with the transition rod 912 pivots around the second coupling pin 965, thus causing the attachment mechanism 920 to open and detach from a notch 950 on the slice above it.

In some preferred embodiments, attachment mechanism 920 is tension sensitive such that it opens and detaches in response to a release in sling tension. Once tension is released, catch (710 in FIG. 7) is allowed to rotate and release a slice. A tension sensitive trigger contributes to the overall safety and stability of the sling load system, preventing a slice from being released prematurely when a slice still hangs upon the sling.

Various embodiments of the release mechanism further require that a trigger be added to each slice, configured to release all the attachment clasps of a slice simultaneously. The simultaneous release trigger may be useful in cases where various conditions prevent delivery of a load in a way that will enable the de-coupling of a single slice from the rest of the load.

The trigger may be activated automatically, possibly in response to an event such as contact being established between the slice and a platform. The trigger may also be manually activated by the person controlling the delivery, such as a helicopter pilot or a crane driver. Activation of the simultaneous release trigger by a human may be wired or wireless.

It is noted that the platform may not be horizontal, have a rough terrain or the like wherein it may be hard to ground a plurality of release triggers simultaneously on the platform. In such cases, it may be useful for a slice to have a single release trigger capable of releasing a plurality of release mechanisms simultaneously.

Reference is now made to FIG. 10, showing a view of an underside of a slice with an embodiment of a simultaneous release trigger 1000. This embodiment includes a single detector 101 O located at the center of a slice and four diagonal rods 1020a, 1020b, 1020c and 1020d coupled respectively to four release mechanisms 1030a, 1030b, 1030c, and 1030d each running on the side arms of the slice. The detector 1010 is configured to detect when contact is being made between the slice and a platform. Once a slice is placed on a platform, the detector 1010 triggers a simultaneous movement of all four diagonal rods 1 020a, 1020b, 1020c and 1020d. The movement of the diagonal rods is transmitted to the four release mechanisms 1030a, 1030b, 1030c, and 1030d at the same time, thus causing all four clasps to de-couple simultaneously. Preferably, de-coupling only occurs when a release in sling tension is detected, indicating that the load I slice is resting upon a surface and no longer hanging from the sling.

The detector 1010 may be positioned in a variety of locations on the container as suit requirements. Optionally, there may be more than one detector. Different detectors may be used to determine a plurality of parameters, such as but not limited to contact being established between the load and a platform, pressure being released from a plurality of coupling mechanisms, or the like. Accordingly, the trigger of the release mechanisms may be configured to respond to any logical combination of the plurality of parameters determined by the detectors.

Although a mechanical coupling mechanism and release trigger are described above, other embodiments may use various alternative mechanisms as required. For example, in one embodiment of the simultaneous release trigger, the detector may be electronic, triggering currents to solenoids connected to each of the coupling mechanisms. In other embodiments, the simultaneous release trigger may utilize mechanical elements such as a pneumatic spring serving as a detector. Still other embodiments will occur to the user as suit requirements. Embodiments may further comprise an activation mechanism, configured to activate the release trigger selectively after a set of conditions has been met. An example of such a condition could be that no pressure is exerted upon the coupling mechanisms. Such a condition may serve as a way to confirm the load is fully resting on the ground, as opposed to hanging above ground, and thus can be released from the sling.

Stacked containers may be configured to attach to additional surfaces which change the aerodynamic shape of the load as a whole. These optional surfaces assist in stabilizing the sling system during flight, and may be useful during high-speed flights.

Reference is now made to FIG. 11, illustrating a procedure 1100 for the delivery of multiple loads to multiple locations in a single sortie using an embodiment of the sling-load system described herein.

The procedure typically commences with the step of preparing a sliced load 1110. The content of the shipment is placed inside containers with coupling mechanism attached to them. The containers are stacked on top of each other, and the attachment clasps on each two containers are closed to vertically couple the different slices to each other.

The procedure continues as the sliced load is attached to a sling system 1120 typically connected to a vertical takeoff aircraft such as a helicopter. As the aircraft takes off, the load is lifted from the ground by the sling. From the point of take off, the procedure continues in a loop: the load is being carried to the drop location of the bottom-most slice 1130; the load is typically being brought in contact with a platform and the release of the bottom slice is triggered 1140; the load is then carried to the target release location of the next slice 1130. If the last slice has been reached, the slice is released in its target location, optionally along with the sling 1150.

Embodiments of the multiple delivery sling-load system and method may be applied to vertical takeoff aircrafts, such as but not limited to helicopters, autogyros, balloons, powered parachutes, rockets and airships. Other embodiments may be used by cranes in the context of construction, manufacturing, warehousing or the like. Vending machines may also utilize embodiments of the multiple delivery sling-load system. The scope of the present invention is defined by the appended claims and includes both combinations and sub combinations of the various features described hereinabove as well as variations and modifications thereof, which would occur to persons skilled in the art upon reading the foregoing description.

In the claims, the word "comprise", and variations thereof such as "comprises", "comprising" and the like indicate that the components listed are included, but not generally to the exclusion of other components.

The invention claimed is:

1. A system comprising:
   a plurality of stacked containers each comprising a coupling mechanism that is configured to:
      connect every pair of adjacent containers of said plurality of stacked containers when a top container of said pair supports the weight of a bottom container of said pair, and
      release the bottom container from the top container when the weight of the bottom container is supported by a platform.

2. The system according to claim 1, further comprising a sling configured to connect an uppermost container of said plurality of stacked containers to a host.

3. The system according to claim 2, wherein the host is an aircraft.

4. The system according to claim 3, wherein the aircraft is a VTOL (Vertical Takeoff and Landing) aircraft.

5. The system according to claim 2, wherein the host is a crane.

6. The system according to claim 1, wherein said coupling mechanism comprises a notch and a catch disposed at opposite vertical sides of each of said plurality of stacked containers, wherein the notch of one container and the catch of an adjacent container form together a clasp enabling the connection and the release.

7. The system according to claim 6, wherein:
   said catch is disposed on the upper side of each of said plurality of stacked containers;

said notch is disposed on the lower side of each of said plurality of stacked containers; and said catch comprises a hook configured to prevent said notch from escaping a grasp of said catch when said clasp is coupled and the top container supports the weight of the bottom container.

8. The system according to claim 7, wherein said coupling mechanism further comprises, in each of said plurality of stacked containers:

a transmission rod extending vertically along a side arm of the container;

a first pin pivotally coupling an upper end of said transmission rod to said catch; and a second pin pivotally coupling said catch to the container, such that, when the weight of the bottom container rests on the platform, said transmission rod of the bottom container is lifted, pushing said catch of the bottom container via said first pin, thereby pivoting said catch of the bottom container around said first pin and releasing said notch of a container above the bottom container from the grasp of said catch of the bottom container.

9. The system according to claim 1, wherein each of said plurality of stacked containers is cuboid.

10. The system according to claim 9, wherein each of said plurality of stacked containers comprises a frame, four side walls, and a floor.

11. The system according to claim 10, wherein said frame is made of a stiff material.

12. The system according to claim 10, wherein the stiff material is selected from the group consisting of: steel, aluminum, and fiberglass.

13. The system according to claim 1, wherein each of said plurality of stacked containers is cylindrical.

* * * * *